United States Patent

[11] 3,547,466

[72] Inventor Joel C. Millican
 34 Burton Hill Drive, Weatherford, Tex. 76086
[21] Appl. No. 795,540
[22] Filed Jan. 31, 1969
[45] Patented Dec. 15, 1970

[54] SUSPENSION SYSTEM FOR AUTOMOBILES
 4 Claims, 7 Drawing Figs.
[52] U.S. Cl. .................................................. 280/124;
 267/34
[51] Int. Cl. .................................................. B60g 19/06
[50] Field of Search ........................................ 267/34;
 280/124.1, 124F, 6F

[56] References Cited
UNITED STATES PATENTS
2,650,108 8/1953 Bruce .......................... 280/124.1
2,809,051 10/1957 Jackson ....................... 267/34X Primary Examiner—Philip Goodman
Attorney—Cecil L. Wood ABSTRACT: A hydraulic suspension system for stabilizing the body structure of motor vehicles, especially passenger automobiles, and which is semiautomatically controlled by a system of hydraulic cylinders and pistons, the valves of which are activated by electrical circuits which are opened and closed by the motion of the vehicle body occasioned by road surface irregularities and lateral momentum due to deviations in the direction of travel, such as at curves and angular turns in the road.

INVENTOR
Joel C. Millican

INVENTOR
Joel C. Millican

BY

ATTORNEY 3,547,466

SUSPENSION SYSTEM FOR AUTOMOBILES

SUMMARY

This invention relates to a stabilizing system for motor vehicles, and it has particular reference to a system of hydraulic cylinders and pistons for controlling the suspension system of the vehicle.

A prime object of the invention resides in the provision of an arrangement of hydraulic cylinders whose pistons are actuated through the automatic opening and closing of electrical circuits having a plurality of solenoid valves connected therein and through linkages connecting the cylinders directly to the conventional suspension system of the vehicle whereby the body thereof can resist excessive vertical and lateral motion imparted thereto through road surface irregularities and directional deviations.

A further object of the invention is that of providing a vehicle suspension system which is calculated to minimize the hazard of upset in traversing curves, or in passing on roadways in which speed is sometimes a necessary factor, and to enable the vehicle to be safely controlled under such conditions.

Yet another object of the invention is that of providing a hydraulic system by which the spring assembly of the vehicle is relieved of a substantial portion of the normal load by reducing the shocks generally encountered on uneven road surfaces, and to afford automatic means, through an electrical circuit, for actuating the system whereby to maintain maximum balance of the vehicle body in cooperation with the conventional suspension system.

While the foregoing objects are paramount, other and lesser objects will become apparent as the description proceeds when considered in connection with the appended drawings wherein.

The invention is primarily concerned with the provision of a hydraulic system whereby to augment the conventional suspension devices common to most standard motor vehicles, especially passenger vehicles. Such conventional apparatus consists of an independent coil spring suspension, two types of which are illustrated generally in FIGS. 1 and 7 of the drawings.

Figure 1:
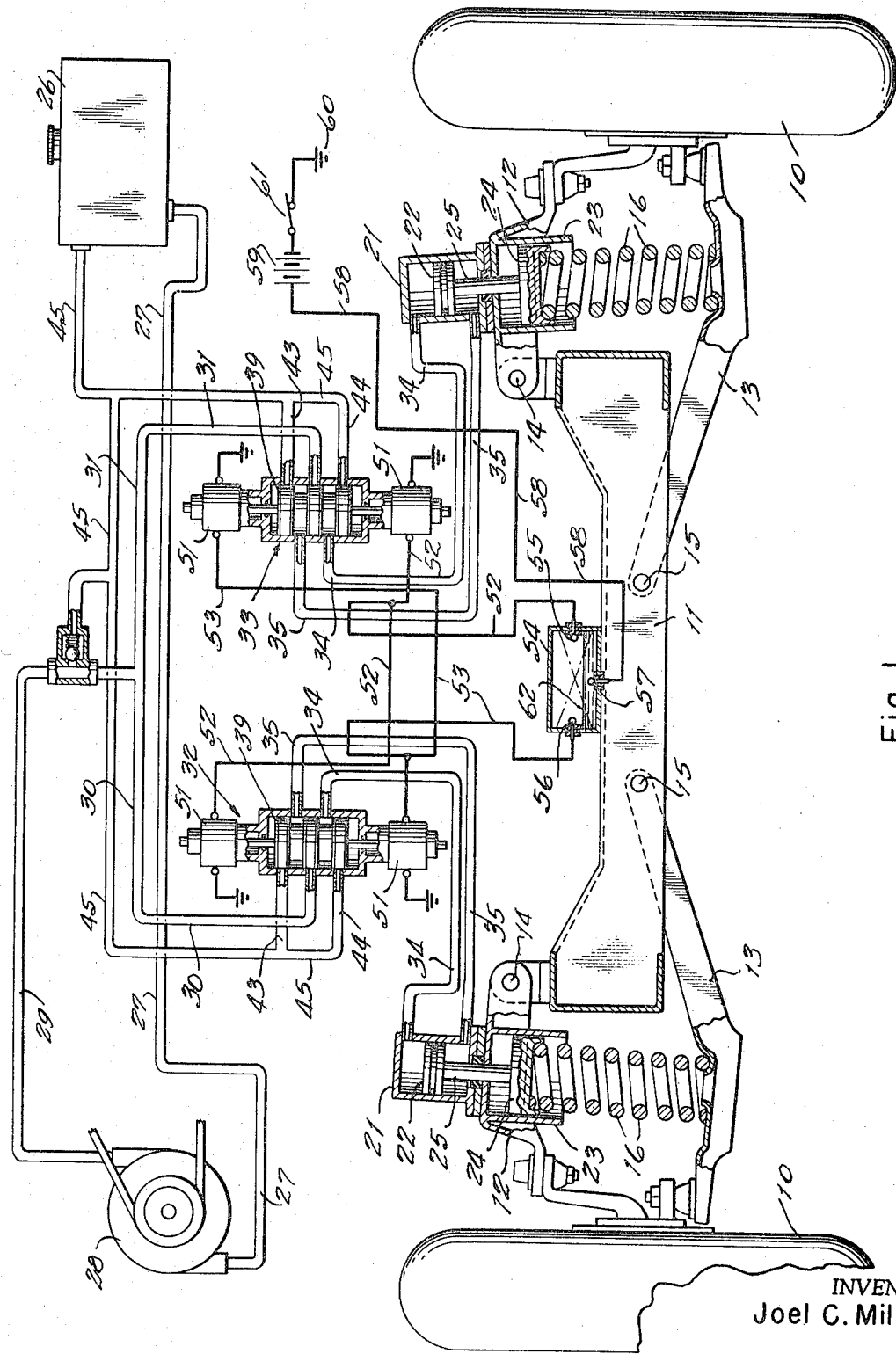
FIG. 1 is a schematic illustration of a conventional front end suspension system embodying the invention, including the several hydraulic cylinders and pistons, and the electrical circuits actuating these elements, the entire system being shown in neutral positions.
Figure 7:
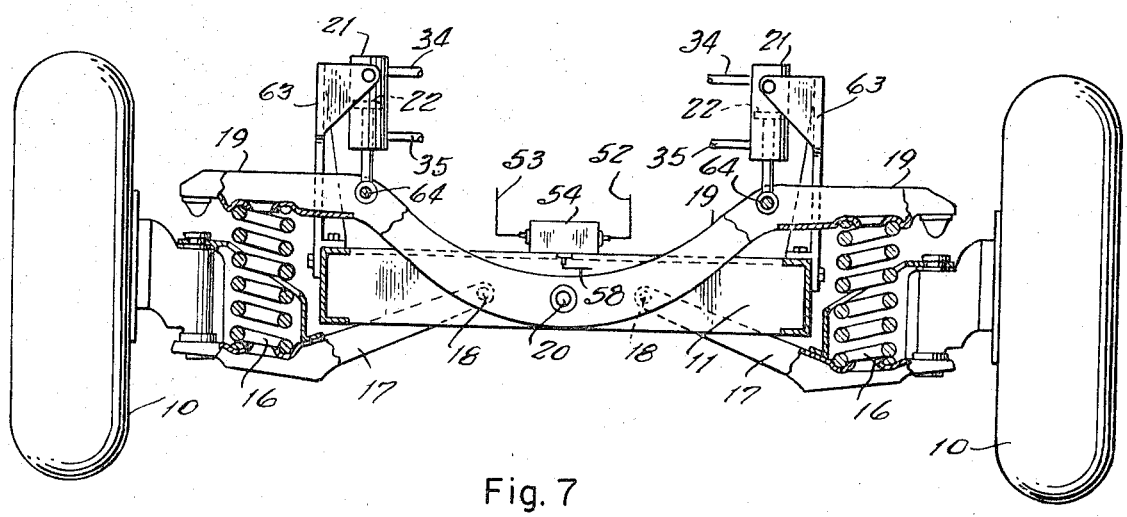
FIG. 7 is a view, in partial section, of a front end suspension system with a floating upper arm assembly, the hydraulic assembly and mercury switch being shown fragmentarily in neutral positions.

In FIG. 1 the front wheels 10 are attached to the vehicle frame 11 by upper and lower linkages 12 and 13 which have respective pivotal connections 14 and 15 to the frame 11. Coil springs 16 are arranged between the linkages 12 and 13. In FIG. 7 the wheels 10 are attached to the frame 11 by lower linkage arms 17, which are pivotally connected to the frame 11 at 18. A crossmember 19 is pivoted intermediate its ends to the frame 11 at 20 and the coil springs 16 are seated at their lower ends on the arms 17 while their upper ends are engaged by seats formed on the outer ends of the crossmember 19. While the two types of suspension devices described are most commonly used, other structures are well known and are similarly composed.

The invention seeks to provide a hydraulic system designed to minimize the pressures normally exerted on the spring system and to materially resist the vertical and lateral movements of the vehicle body encountered in varying road conditions and speed, traversing curves, passing other vehicles, and the like, and minimizing the hazard of upset.

One embodiment of the invention is shown in FIG. 1 and primarily comprises a pair of hydraulic cylinders 21, having pistons 22 therein, one of such units being mounted on each of the upper linkages 12, the latter having depending cylindrical receptacles 23 formed therewith to receive the upper ends of the coil springs 16 seated in cavitations formed in the lower surfaces of pistonlike members 24 on the lower ends of the rods 25 of the hydraulic pistons 22 in the cylinders 21, the lower ends of the springs 16 being seated on the lower linkages 13. As will become apparent, the pistons 22 will control the action of the springs 16 with the cooperation of other elements which will be presently described.

The schematic illustration in FIG. 1 shows a fluid reservoir 26 having a flow conduit 27 connected to a pump 28, which may be driven by the vehicle engine, and a return conduit 29 connected to flow conduits 30 and 31 for directing hydraulic fluid to a pair of two-way valves 32 and 33, respectively, which alternately control the fluid flow to the cylinders 21, attached to the top links 12, through conduits 34 and 35 connected, respectively, to the upper and lower ends of the cylinders 21.

Figure 2:
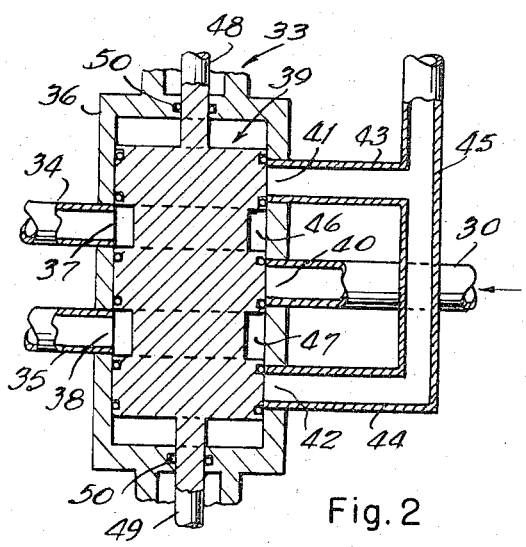
FIG. 2 is an enlarged sectional view of one of the hydraulic control valve units in which the plug is shown in neutral position.
Figure 3:
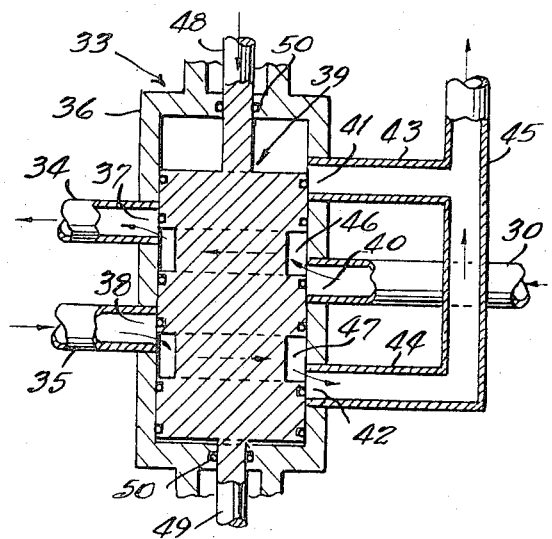
FIG. 3 is another enlarged sectional view, similar to FIG. 2, in which the plug is in its lowermost position, the fluid flow being indicated by arrows.
Figure 4:
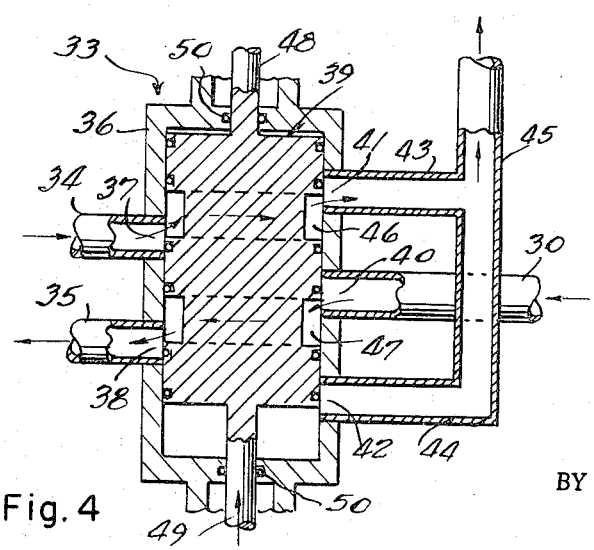
FIG. 4 is yet another enlarged sectional view similar to FIGS. 2 and 3, the plug being shown in its uppermost position, the fluid flow being indicated by arrows.

The valves 32 and 33 are identical in structure, having a cylindrical housing 36 with alternate inlet and outlet ports 37 and 38 into which the conduits 34 and 35 are respectively connected, as shown in FIG. 1, and in greater detail in FIGS. 2, 3 and 4 in which the pistons or plugs 39 are shown in their respective positions in the housings 36, the arrows indicating the direction of flow through the several ports. An inlet port 40 and two outlet ports 41 and 42 are provided in the housing 36, and these ports are offset in relation to the ports 37 and 38. One of the conduits 30 and 31 is connected to the port 40 in each valve housing 36 as inlet flow conductors. Connected to the respective outlet ports 41 and 42 are branch conduits 43 and 44 of a conduit 45 which is connected to the reservoir 26 whereby fluid is returned to the latter from the valves 36.

The piston or plug 39 of each valve 33 or 34 is formed with a pair of circumferential grooves 46 and 47 each providing an annular fluid passage within the housing 36 capable of alternately effecting communication between the inlet and outlet ports 37 and 38 and the inlet port 40 and the port 41 or 42, as indicated in FIGS. 3 and 4. The plug 39 is shown in neutral position in FIG. 2, in which all of the ports 40, 41 and 42 are covered. In FIG. 3 the ports 37 and 38 are open to the ports 40 and 42, respectively, and in FIG. 4 the ports 37 and 38 are open to the ports 40 and 41. The arrows in each of these views indicate the direction of flow through the valves.

Each of the plugs 39 has an integral stem 48 on one end and a stem 49 on the other, each operatively extending through its respective end of the housing 36 and having a suitable packing ring 50 therearound. Each stem 48 and 49 has a solenoid 51 attached to its outer end for shifting the plug 39 from one of its operative positions to the other when the electrical circuits 52 and 53 therefor are closed through a mercury switch 54 connected therein, as shown in FIG. 1.

The mercury switch 54 may be of conventional design, having electrodes 55 and 56 connected into the circuits 52 and 53 and an electrode 57, as shown in FIG. 1, which is connected into a conductor 58 to the source 59 and the ground 60. A manual switch 61 is provided in the conductor 58. The electrodes 55 and 56 are so arranged as to be contacted by the fluid mercury 62 in the switch 54, as indicated in broken lines in FIG. 1, depending upon the lateral inclinations of the frame 11.

The modified structure shown in FIG. 7 has the same function as that shown in FIG. 1, differing primarily in the use of the rocking crossmember 19 instead of the upper linkage 12 of the structure shown in FIG. 1. The cylinders 21, with their pistons 22 therein, are pivotally supported on brackets 63 rigidly attached to each side of the vehicle frame 11. The rod or stem 25 of each piston 22 has its free end pivoted at 64 to the crossmember 19. The conduits 34 and 35 are connected into the cylinders 21 in the same manner as that shown in FIG. 1, and the flow of hydraulic fluid is controlled by the same type of valve system and the mercury switch 54.

Figure 6:
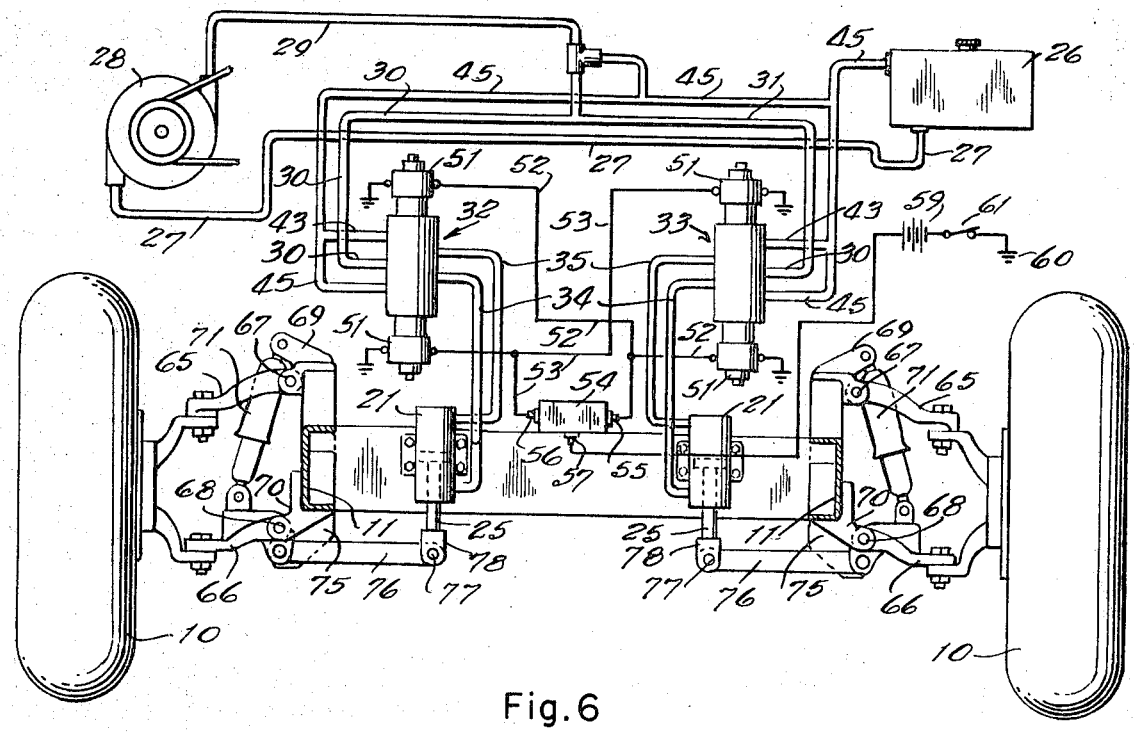
FIG. 6 is a transverse sectional view, on line 6—6 of FIG. 5, and schematically illustrating the hydraulic system by which the torsion bars are controlled, including the mercury switch and solenoids in the electrical circuits, all in neutral positions.
Figure 5:
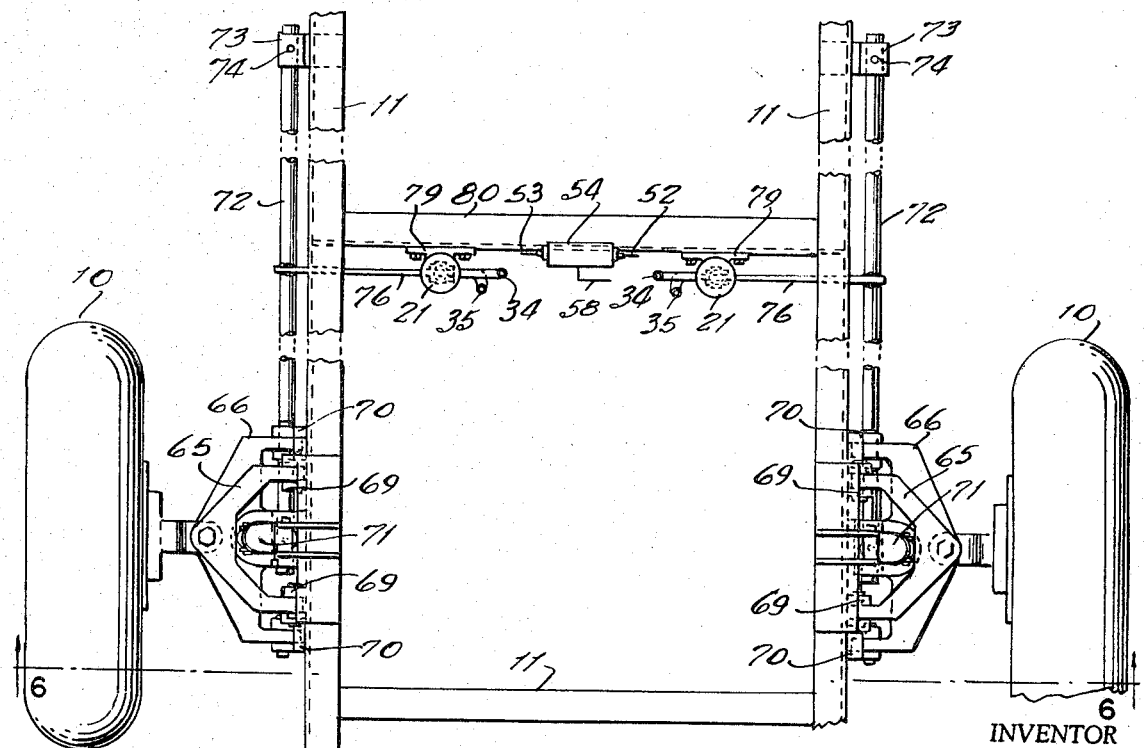
FIG. 5 is a fragmentary plan view of a vehicle frame and front end suspension system embodying the invention and showing a pair of torsion bars having linkage with a pair of hydraulic cylinder and piston units controlled by a mercury switch in an electrical circuit.

A further modification of the application of the improved hydraulic system is shown in FIGS. 5 and 6 in which a different type of suspension system is employed but which is of generally conventional design. The wheels 10 are connected to the frame 11 by upper and lower linkage plates 65 and 66, respectively, pivoted at 67 and 68 to brackets 69 and 70 attached to the frame 11. A conventional type of shock absorber 71 is provided for connecting the upper and lower linkage plates 65 and 66.

The structure shown in FIGS. 5 and 6 has embodied therein a pair of torsion rods or bars 72 arranged along each side member of the frame 11, as best shown in FIG. 5, and have their rearmost ends secured thereto by brackets 73 in which the members 72 are secured against rotation by pins 74 arranged through the brackets 73. The bars 72 are pivotally supported by brackets 75 on the frame 11 at their forward ends, and are integrally attached intermediate their ends to one end of a pair of linkage arms 76 whose opposite ends are pivotally connected at 77 to clevises 78 on the lower ends of the rods 25 of the pistons 22 in the cylinders 21, as shown in FIGS. 5 and 6, which are secured by brackets 79 attached to a crossmember 80 arranged transversely of the frame 11 rearwardly of the front wheel assembly.

OPERATION

The valves 32 and 33 and the pistons 22 of the cylinders 21 are shown in FIG. 1 in the neutral positions, as when the vehicle is standing. The mercury switch 54 is open and the electrical circuits 52 and 53 of the solenoids 51 are inoperative. When the vehicle is moving the rocking motion imparted to the frame 11 will cause the mercury 62 in the switch 54 to shift and make contact between one of the electrodes 55 or 56 and the electrode 57 to actuate the respective valves 32 or 33 whereby to admit hydraulic fluid to the respective cylinders 21.

The operation of the valves 32 and 33 is best illustrated in FIGS. 2, 3 and 4. In FIG. 2 the plug 39 is shown in its neutral position, all of the ports being closed. FIG. 3 shows the plug 39 in its lowermost position, having been acted upon by the upper solenoid 51, to cause the fluid to flow through the port 38, the lower groove 47, and out through the port 42 to the reservoir 26, as indicated by the arrows. At the same time the fluid enters through the port 40 and out through the port 37.

FIG. 4 shows the reverse movement of the fluid, the plug 39 being in its uppermost position, having been acted upon by the lower solenoid 51, to cause the fluid to enter through the port 37 and out through the port 41, and thence to the reservoir 26, while the ports 38 and 40 are opened to admit the fluid from the pump 28 to the bottom of the affected cylinder 21. The pistons 22 in the cylinders 21 are operative in either direction and are thus capable of resisting or cushioning the shock imparted by the rebound of the springs 16.

The arrangement of the several elements shown and described may be modified to suit the structural arrangement of suspension system to which the invention may be applied.

I claim:

1. In a hydraulic control mechanism for a suspension system for motor vehicles having a frame, upper and lower suspension links pivotally connecting the front wheels to said frame, and biasing means separating said links, in combination, a hydraulic cylinder, having a piston therein, mounted on each of said upper links, the said pistons being operatively connected to said biasing means for resisting the action thereof, a two-way valve having fluid conduits connected therein communicating with each of said cylinders on each side of the piston therein whereby to control the movement thereof, a fluid reservoir having fluid inlet and outlet conduits connecting the same to said two-way valves, a solenoid on each end of each of said valves for operating the same to intermittently and alternately change the direction of fluid flow therethrough, an electrical circuit for said solenoids and a mercury switch in said circuit and a fluid pump for circulating hydraulic fluid through said valves.

2. The structure of claim 1, the said biasing means comprising coil springs.

3. The structure of claim 2, each of said pistons in said cylinders having a stem extending below said cylinders, and having a cavitated member on its lowermost end, the said coil springs having their upper ends seated in said cavitated member.

4. The structure of claim 1, the said two-way valves having a cylindrical housing and a plug operating in said housing, each of said plugs having a plurality of circumferential grooves therein defining annular fluid passages, a stem on each end of said plugs whereby said solenoids are connected to said plugs to actuate the same in alternate directions in said cylinders.